Aug. 12, 1969  D. M. ALMASY  3,460,684
COIL RACK
Filed May 10, 1967

INVENTOR.
DAVID M. ALMASY
BY
*W. B. Harpman*
ATTORNEY 3,460,684
COIL RACK
David M. Almasy, 2233 N. Hubbard Road,
Hubbard, Ohio 44425
Filed May 10, 1967, Ser. No. 637,486
Int. Cl. A47f 7/00; B60p 7/00; B61d 3/16
U.S. Cl. 211—13                                     3 Claims

ABSTRACT OF THE DISCLOSURE

A coil rack for holding coils of steel and the like, arranged to hold wooden four-by-fours to present flat surfaces thereof in supporting relation and flat contact with the coils being held thereby.

---

This invention relates to a coil rack, and more particularly to a rack formed of a pair of duplicate assemblies including upstanding metal angles mounted in spaced relation on a truck or trailer bed for receiving and supporting wood four-by-fours which in turn receive and hold coils of steel strip.

A further object of the invention is the provision of a coil rack that may be inexpensively formed and readily positioned on a truck or trailer.

A still further object of the invention is the provision of a coil rack that will receive and hold wooden four-by-fours in various positions spaced relative to one another so as to accommodate various diameters and lengths of steel coils and the like.

A still further object of the invention is the provision of a coil rack that positions coil engaging wooden members so as to preclude creasing or otherwise damaging the steel in the coils to be supported thereby.

The coil racks disclosed herein are particularly advantageous when used in supporting thin steel strip coils having a desirable smooth unbroken surface and from which steel various metal articles including automobile bodies and parts are to be formed. Those skilled in the art will recognize that steel coils have heretofore been shipped on trucks or trailers and the like, and that they are generally positioned on a pair of spaced four-by-fours so as to locate the coil and enable it to be secured to the truck or trailer body. The four-by-fours are positioned on the flat bed of the truck or trailer body and as a result their longitudinally extending corners directly engage the outer radius of the coil. The steel coils are heavy and the steel in the coils is often creased where it engages the longitudinal corners of the four-by-fours. This results in rendering portions of the steel in the coil unusable by the purchaser, who rejects the material as damaged and unsuitable for his stamping operations. The present invention overcomes this difficulty by providing a simple metallic rack which will receive the four-by-fours and hold them in angular relation to the flat bed of the truck or trailer body, whereupon the radius of the coil of steel positioned between the angularly disposed four-by-fours conforms generally with the flat surfaces of the four-by-fours and avoids creasing or otherwise marking or damaging the steel in the coils.

SUMMARY OF THE INVENTION

A rack for holding coils of metal strip and comprising a pair of elongated body members, each of which has several inverted V-shaped angle members on its upper surface and adjacent it ends and a pair of cross-sectionally rectangular wooden members positioned transversely of said elongated body members and against oppositely disposed pairs of said inverted V-shaped angle members.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
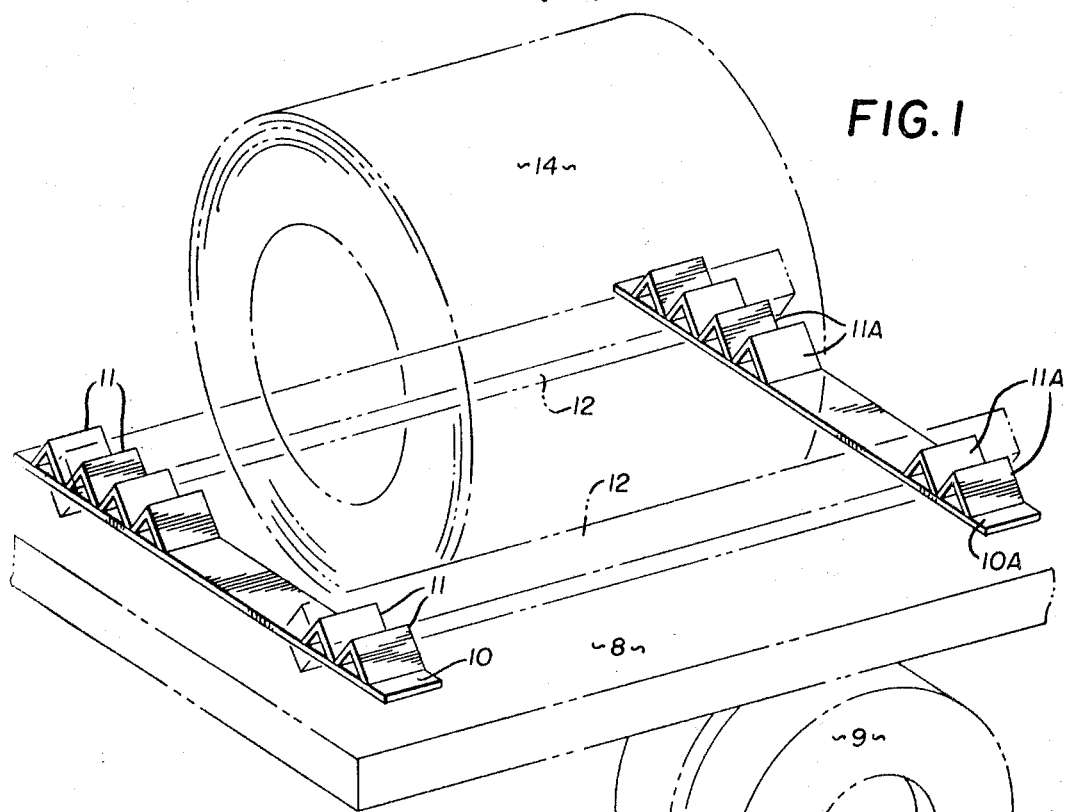
FIGURE 1 is a perspective view showing a pair of the coil racks with broken lines illustrating a portion of a trailer flatbed four-by-fours positioned on the coil rack and a coil held thereby.
Figure 2:
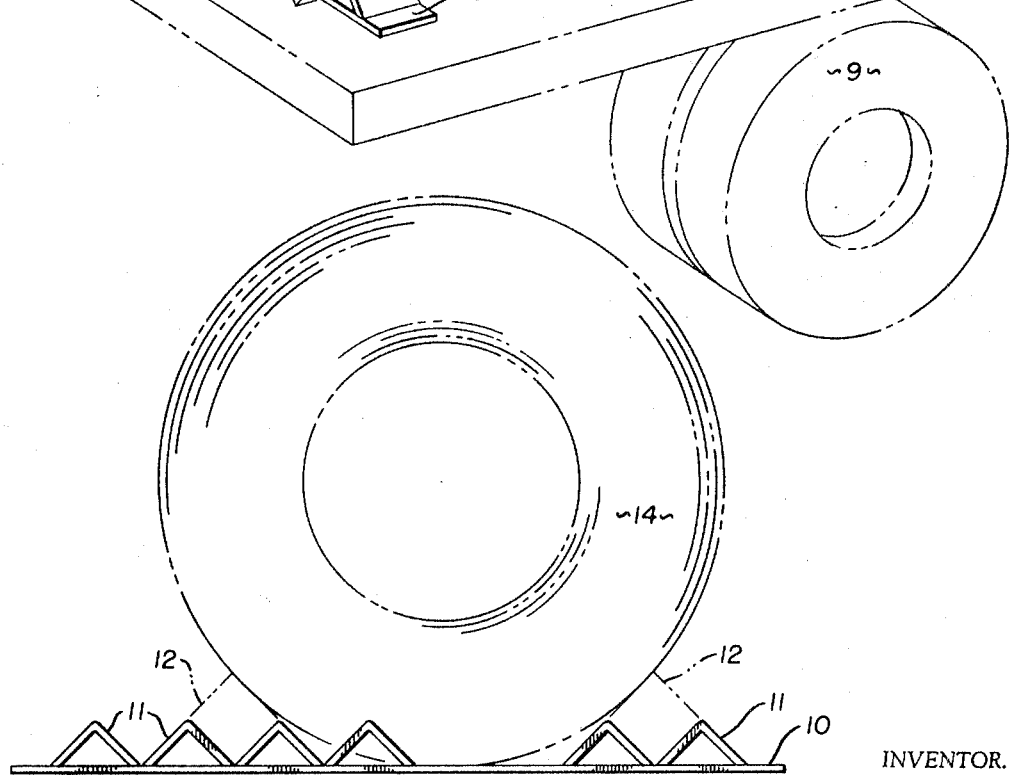
FIGURE 2 is a side elevation of one of the coil racks seen in FIGURE 1.

By referring to FIGURE 1 it will be seen that broken line illustration of a truck or trailer flatbed 8 carried on suitable ground engaging wheels 9 is illustrated, and that a pair of duplicate coil rack members are shown in position on the flatbed 10. These coil rack members comprise an elongated narrow flat body member 10 having a plurality of upstanding inverted V-shaped angle members 11 positioned thereon and secured thereto as by welding. As seen in FIGURE 1 of the drawings, two of the inverted V-shaped angle members 11 are positioned adjacent one end, the right end, of the body member 10 and four of the upstanding inverted V-shaped angle members 11 are positioned adjacent the other end of the body member 10. A second duplicate assembly represented by numerals 10–A is positioned on the flatbed 10 in spaced relation to the first assembly and a pair of four-by-fours 12 are shown in broken lines positioned between the spaced pairs of upstanding inverted V-shaped angle members 11 so that two of their four flat surfaces form extensions of the angular surfaces of the upstanding inverted V-shaped angle members 11, as best seen in FIGURE 2 of the drawings.

A coil 14 of strip steel or other metal is shown in broken lines and positioned with its outer radius engaging the conforming angular surfaces of the four-by-fours 12 and with the bottommost portion of the coil 14 resting on the flatbed 10 between the body members 10.

It will be observed that when coils of different diameters are used the four-by-fours 12 are simply repositioned in the several alternate locations so that they conform to the outer diameter of the coil, and it will be observed that the coil rack thus disclosed always positions the four-by-fours so that they have flat surfaces engaging the radius of the coil rather than their longitudinal sharp angular edges.

The coil rack disclosed herein therefore meets the several objects of the invention, and having thus described my invention, what I claim is:

1. A coil rack for use in holding a coil of strip steel and consisting of a pair of spaced elongated body members, a plurality of upstanding, inverted V-shaped angle members positioned transversely on each of said elongated body members adjacent the opposite ends thereof, the overall length of said elongated body members being comparable with the diameter of said coil of strip steel to be held thereby, a pair of spaced cross sectionally rectangular wooden members positioned transversely of said elongated body members and against said inverted V-shaped angle members thereon so as to receive and retain said coil positioned therebetween.

2. The coil rack set forth in claim 1 and wherein the elongated body members comprise sections of steel plate and the upstanding inverted V-shaped angle members comprise sections of angle formed steel welded thereto.

3. The coil rack set forth in claim 1 and wherein there are at least a pair of said upstanding inverted V-shaped angle members on each end of each of said elongated body members.

References Cited

UNITED STATES PATENTS

| | | | | |
|---|---|---|---|---|
| 486,664 | 11/1892 | Davidson | 211—60 |
| 1,757,866 | 5/1930 | Johnson | 248—119 X |
| 2,262,794 | 11/1941 | Burbank | 214—10.5 |
| 2,227,870 | 1/1941 | Thomas | 105—368 X |
| 3,161,296 | 12/1964 | Sartor | 211—60 |
| 3,291,073 | 12/1966 | James | 248—119 X |

CHANCELLOR E. HARRIS, Primary Examiner

U.S. Cl. X.R.

105—367, 369; 280—179